Oct. 19, 1948.   W. H. BASELT   2,451,709
COOLED BRAKE ROTOR
Filed Jan. 1, 1944   2 Sheets-Sheet 1
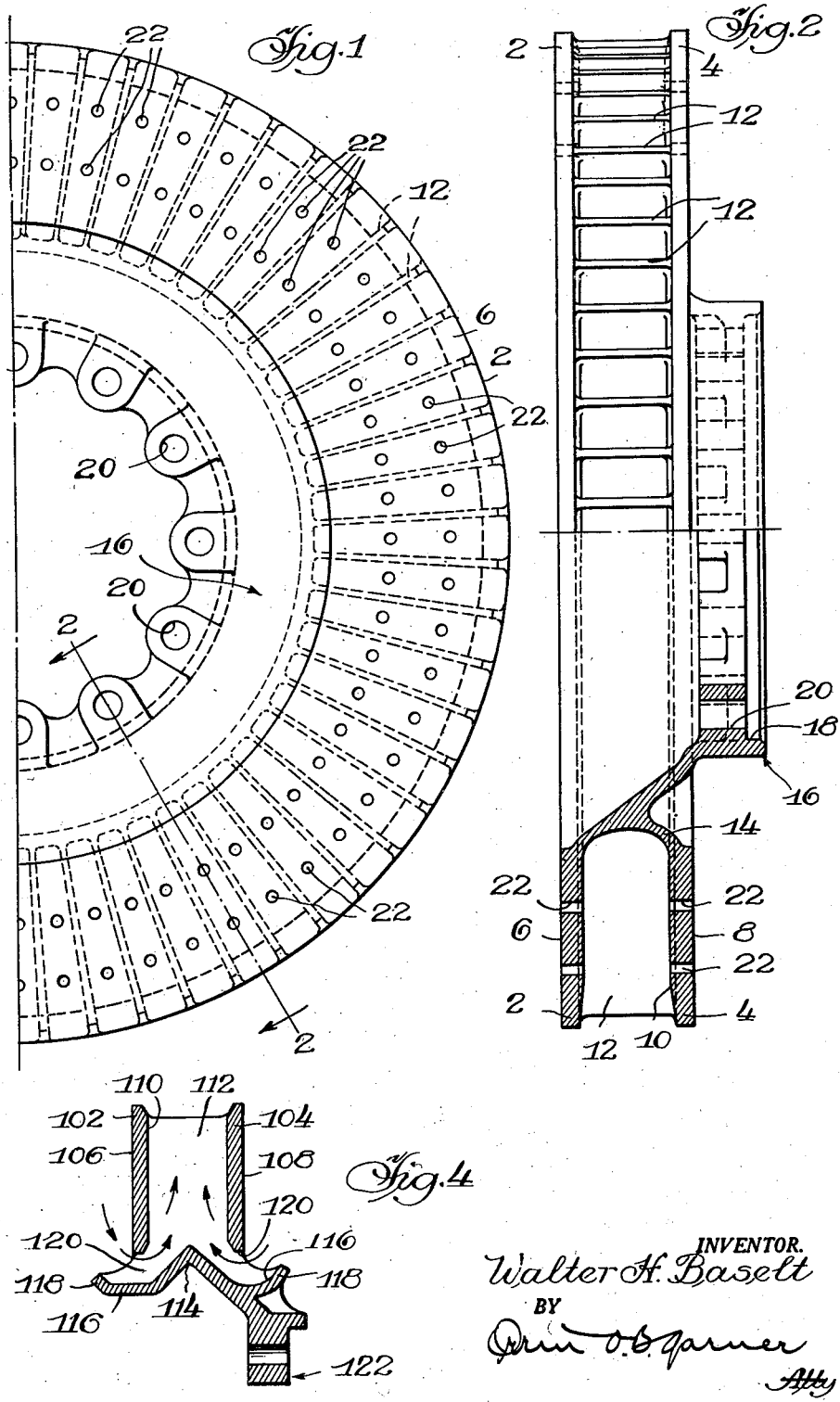
INVENTOR.
Walter H. Baselt
BY
Atty

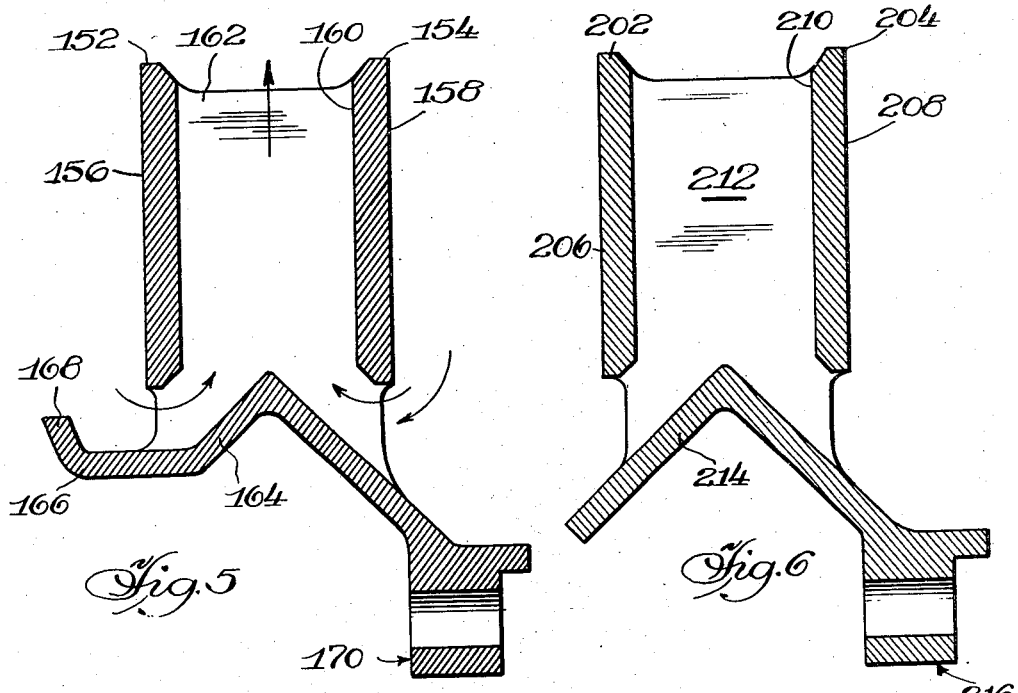
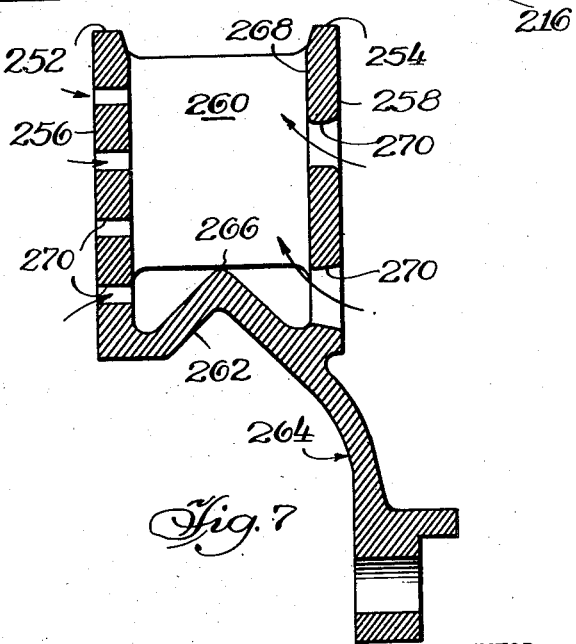
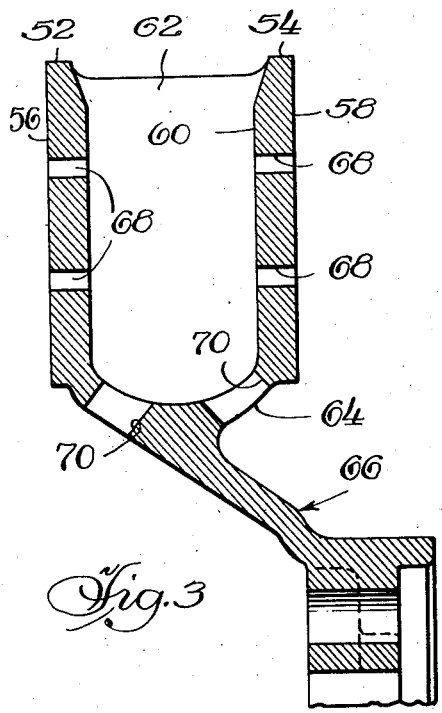

Patented Oct. 19, 1948

2,451,709

UNITED STATES PATENT OFFICE 2,451,709

COOLED BRAKE ROTOR

Walter H. Baselt, Chicago, Ill., assignor to American Steel Foundries, Chicago, Ill., a corporation of New Jersey Application January 1, 1944, Serial No. 516,677

15 Claims. (Cl. 188—264)

My invention relates to brake discs and more particularly to a brake rotor of the centrifugal or peripheral blower type which is operable to circulate a fluid cooling medium therethrough during rotation thereof.

My novel rotor is particularly designed for application to the wheel of a railway car truck; however, it will be understood that the rotor may be utilized in any arrangement and in any suitable fluid medium to which it may be adapted.

The principal object of my invention is to design a rotor of the above described type in which novel fluid inlet means is provided for the fluid chamber within the brake ring of the rotor. The novel inlet means is formed and arranged for directing fluid from the friction faces of the brake ring into the fluid chamber therewithin, thus removing the undesirable insulating film of fluid which normally rotates with and adheres to the friction surfaces of the ring.

A further object of my invention is to provide a novel support structure for the brake ring, said structure including a hub member with an annular web extending axially of the brake ring and connected to the inner perimeter thereof.

In the drawings, Figure 1 is a fragmentary side elevation of a novel brake rotor embodying my invention, only one-half of the rotor being illustrated inasmuch as it is a symmetrical annular member.

Figure 2 is a composite view taken from the right as seen in Figure 1, the top half of Figure 2 being an edge elevation and the bottom half thereof being a sectional view taken in the radial plane indicated by the line 2—2 of Figure 1.

Figures 3 to 7 inclusive are sectional views illustrating respectively modifications of my novel rotor, each of said figures being a view in radial cross-section.

Describing my invention in detail and referring first to the embodiment thereof as illustrated in Figures 1 and 2, the rotor comprises spaced annular plates 2 and 4 with friction surfaces 6 and 8 on their remote sides, said plates defining a fluid chamber 10 therebetween. Extending between the plates 6 and 8 are the spaced blades 12, 12, said blades being preferably radial with respect to the axis of the rotor; however, it will be understood by those skilled in the art that the blades may be of any suitable form and arrangement provided that they extend transversely between the plates 2 and 4 in order to afford a peripheral or centrifugal blower action as hereinafter described. It will also be understood that the blades 12, 12 function as columns to resist braking pressures applied against the surfaces 6 and 8.

The plates 2 and 4 are connected at their radially inner extremities by the annual web 14. A hub member generally designated 16 is provided, said hub member being of a somewhat bell-shaped form and being connected at its outer perimeter to the web 14. At its inner perimeter the hub member 16 is provided with a bore 18 for the reception of a portion of an associated rotating member such as, for example, the wheel of a railway car truck, and said hub member is provided with the openings 20, 20 therethrough for the reception of means securing the rotor to its associated rotating element.

Fluid inlets 22, 22 for the chamber 10 are provided through the plates 2 and 4, said inlets being preferably in the form of round openings through said plates. It will be understood that during rotation of the rotor, the fluid medium in which it rotates will be drawn into the chamber 10 through the inlets 22, 22 and will be thrown radially outwardly from said chamber by means of a centrifugal or peripheral action, as will be clearly understood by those skilled in the art. Inasmuch as the openings 22, 22 through the friction plates 2 and 4 interrupt the friction surfaces 6 and 8 thereon, it will be apparent that films of fluid normally adhering to and rotating with the surfaces 6 and 8 will be drawn into the openings 22, 22 thus removing these insulating films of fluid and facilitating cooling of the surfaces 6 and 8.

Referring now to Figure 3, it will be seen that the embodiment thereof is generally similar to that of Figures 1 and 2 and comprises the spaced annular plates 52 and 54 presenting on their remote surfaces the braking faces 56 and 58 respectively, said plates defining a fluid chamber 60 therebetween. Radial blades 62, 62 extend between the plates 52 and 54 as in the previously described embodiment; and the plates are connected at their radially inner extremities by the annular web 64, which is connected to the outer perimeter of the hub member generally designated 66.

Fluid inlet openings 68, 68 are provided for the chamber 60 through the plates 52 and 54, and additional fluid inlet openings 70, 70 are provided through the web 64. It will be understood that the modification illustrated in Figure 3 is substantially identical with that illustrated in Figure 1 except for the fact that the annular web connecting the inner perimeters of the plates 52 and 54 is provided with the fluid inlet openings 70, 70.

Figure 4 shows another modification of my invention in which the rotor comprises the spaced annular plates 102 and 104 presenting the friction faces 106 and 108 respectively on their remote surfaces, said plates defining a fluid chamber 110 therebetween. Radial blades 112, 112 extend between the plates 102 and 104, and connected to the radially inner extremities of said blades is the annular web 114 of V-shape in radial cross-section as illustrated in Figure 4, the apex of said V extending radially outwardly between the plates 102 and 104.

At each side thereof the web 114 is provided with the axially extending flange 116 which is reflanged as at 118 in a radially outward direction, the blades 112, 112 extending radially inwardly to merge with the flanges 116, 116 and the reflanges 118, 118.

Fluid inlet passages 120, 120 are defined by the radially inner extremities of the plates 102 and 104 and the adjacent portions of the web 114, and it may be noted that the flanges 116, 116 and the reflanges 118, 118 serve as baffles to direct fluid from the friction surfaces 106 and 108 into the chamber 110 through the inlet passages 120, 120, the fluid being thrown radially outwardly from the chamber 110, as will be understood by those skilled in the art. The manner in which the fluid is circulated through the rotor is illustrated by arrows in Figure 4, and it will be understood that by means of this novel construction there is a tendency for the fluid to be circulated away from the friction surfaces 106 and 108, thus breaking up the layers of fluid which normally adhere to and rotate with these friction surfaces.

Integrally formed with the web 114 is a hub 122 generally similar to those described for the previous embodiments.

Referring now to Figure 5 which illustrates another modification of my invention, the rotor comprises the spaced annular friction plates 152 and 154 presenting on their remote surfaces the friction faces 156 and 158 respectively, said plates defining therebetween the annular fluid chamber 160. Radial blades 162, 162 extend between the plates 152 and 154 and integrally formed with the radially inner extremities of said blades is the V-shaped web 164 which is provided at one side only thereof with an axially extending annular flange 166 having the annular reflange 168 extending radially outward to afford a baffle as in the modification of Figure 4. The opposite side of the web 164 is formed with the hub 170.

The modification illustrated in Figure 6 is generally similar to those of Figures 4 and 5 and comprises the spaced friction plates 202 and 204 with the friction faces 206 and 208 respectively, said plates defining the fluid chamber 210 therebetween. Blades 212, 212 extend between the plates 202 and 204, and integrally formed with the inner extremities of the blades is a V-section annular web 214 integrally formed with the hub 216. The modification of Figure 6 is substantially the same as those of Figures 4 and 5 except that the V-section web 214 is unflanged.

Figure 7 illustrates still another modification of my invention wherein the rotor comprises the spaced annular plates 252 and 254 having the friction surfaces 256 and 258 respectively. Radial blades 260, 260 extend between the plates 252 and 254. Connecting the radially inner extremities of the plates is a V-section web 262 merging at one side thereof with the hub member 264. The apex of the V-section web 262 extends radially outwardly between the plates 252 and 254 to merge as at 266 with the blades 260, 260, thus reinforcing the structure.

Between the plates 252 and 254 is the fluid chamber 268, and inlet means for said fluid chamber are provided in the form of openings 270, 270 through the friction plates 252 and 254. It may be noted that the openings 270, 270 in the plate 254 are flared along smooth radii to facilitate passage of fluid therethrough into the chamber 268.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a rotor, a brake ring comprising a pair of spaced annular plates defining a fluid chamber therebetween, said plates having friction faces on their remote surfaces, spaced blades extending between said plates, an annular web connected to the radially inner extremities of said blades, said web comprising a portion of V-shape in radial cross-section, the apex of said V projecting radially outwardly between said plates and the sides of said V being spaced from the inner perimeter of said plates and defining fluid passages therewith communicating with said chamber, and a hub member integrally formed with said web, said portion being axially flanged on at least one side thereof, said flange having a radially outwardly extending reflange to afford a baffle for directing fluid between said portion and the inner perimeter of the adjacent plate from the adjacent friction face into said chamber.

2. In a brake rotor, a brake ring comprising a plurality of spaced annular plates defining a fluid chamber therebetween, friction surfaces on the remote sides of said ring, blades extending between said plates, and a hub member integrally formed with a web connected to the radially inner extremities of said blades, said web being spaced from the inner perimeters of said plates and extending axially outwardly of said ring at opposite sides thereof, and baffle means on the sides of said web for directing fluid from said surfaces into said chamber, said baffle means comprising annular flanges on said web at opposite sides thereof, said flanges extending radially outwardly.

3. In a brake rotor, a brake ring comprising a plurality of annular plates with transverse blades extending therebetween, said plates defining a fluid chamber therebetween, a support web connected to the radially inner extremities of said blades, said web comprising a V-shaped portion in radial cross-section with the apex of said V projecting radially outwardly into said chamber and the sides of said V being spaced from the inner perimeter of said plates and defining fluid passages therewith communicating with said chamber, and a support hub on said web, said V-shaped portion being flanged and reflanged at each side thereof to form a W-section, the reflanged portions of said web being disposed axially outwardly of and spaced from said ring to afford a fluid baffle.

4. In a brake rotor, a brake ring comprising of spaced annular plates defining a fluid chamber therebetween, said plates having friction faces on their remote surfaces, spaced blades extending between said plates, a support web connected to the radially inner extremities of said blades, said web comprising a portion of V-shape in radial cross-section, the apex of said V projecting radially outwardly between said plates and the sides of said V being spaced from the inner perimeter of said plates and defining fluid passages therewith communicating with said chamber, and a support hub integrally formed with said web, said portion being flanged and reflanged at opposite sides thereof to define a W-section.

5. In a brake rotor, a brake ring comprising a pair of annular plates defining a fluid chamber therebetween, and blades extending between said plates, a hub member comprising an annular web connected to the inner perimeter of said ring, fluid inlet passages disposed at the radially inner extremity of said ring and communicating with said chamber, said web comprising a portion of V-shape in radial cross-section, the apex of said V projecting radially outwardly between said plates, and fluid baffle means formed on the radially inner extremities of said V-shaped portion.

6. In a brake rotor, a brake ring comprising a plurality of spaced annular plates defining a fluid chamber therebetween, friction surfaces on the remote sides of said ring, blades extending between said plates, and a hub member integrally formed with a web connected to the radially inner extremities of said blades, said web being spaced from the inner perimeters of said plates and extending axially outwardly of said ring at opposites sides thereof and defining fluid passages communicating with said chambers, and baffle means on the sides of said web for directing fluid from said surfaces through said passages into said chamber.

7. In a rotor, a brake ring comprising a pair of spaced annular plates defining a fluid chamber therebetween, said plates having friction faces on their remote surfaces, spaced blades extending between said plates, a support web connected to the radially inner extremities of said blades, said web comprising a portion of V-shape in radial cross-section and extending axially outwardly of said ring at opposite sides thereof, the apex of said V projecting radially outwardly between said plates with the sides of said V-shaped portion spaced from said plates and defining fluid passages therewith communicating with said chamber, and a support hub integrally formed with said web.

8. In a brake rotor, a brake ring comprising a pair of annular plates defining a fluid chamber therebetween, and blades extending between said plates, a hub member comprising an annular web connected by said blades to the inner perimeter of said ring, and fluid inlet passages disposed at the radially inner extremity of said ring and communicating with said chamber, said web comprising a portion of V-shape in radial cross-section and extending axially outwardly of said ring at opposite sides thereof, the apex of said V projecting radially outwardly between said plates and the sides of said V-shaped portion being spaced from said plates for defining said fluid passages.

9. In a brake rotor, a brake ring comprising a plurality of spaced annular friction plates defining an annular fluid chamber therebetween, and blades extending between said plates, a hub member comprising an annular web connected by said blades to the inner perimeter of said ring, reversely arranged diagonal fluid passages at the inner perimeter of said ring communicating with said chamber, and baffle means on said web spaced from the inner perimeter of respective plates for directing air from the friction faces of said plates through said passages.

10. In a brake rotor, a brake ring comprising a pair of annular plates defining a fluid chamber therebetween and blades extending between said plates, a hub member comprising an annular web connected to the inner perimeter of said ring and extending axially outwardly of said ring at opposite sides thereof providing reversely arranged diagonal fluid inlet passages disposed at the radially inner extremity of said ring and communicating with said chamber.

11. In a brake rotor, a plurality of annular plates defining an annular fluid chamber therebetween, blades extending between said plates, friction faces on the remote surfaces of said plates, a hub integrally formed with a web connected to said blades, said web being spaced from the inner perimeters of said plates and providing angularly arranged fluid passages communicating with said chamber, and baffle means on said web for directing air from adjacent said surfaces into respective of said passages.

12. In a brake rotor, a brake ring comprising spaced annular plates defining a fluid chamber therebetween, said plates having friction faces on their remote surfaces, blades extending between said plates, a web connected to said blades, said web extending axially of said ring in spaced relationship to the inner perimeter thereof and providing angularly arranged fluid inlet passages communicating with said chamber, and means extending outwardly on opposite sides of said web for directing fluid from said friction faces into said passages.

13. In a rotor, a plurality of spaced annular plates defining a fluid chamber therebetween, blades extending between said plates, a support web connected to the radially inner extremities of said blades and spaced from the inner perimeter of said plates, said web being V-shaped in radial cross-section with the apex of said V projecting radially outwardly into said chamber and extending axially outwardly of said ring at opposite sides thereof and the sides of said V being spaced from the inner perimeter of said plates and defining fluid passages therewith communicating with said chamber.

14. In a brake rotor, a brake ring comprising a plurality of spaced angular plates, blades extending between said plates, and a hub member comprising a web connected to the radially inner extremities of said blades, said web being V-shaped in radial cross-section and extending axially outwardly of said ring at opposite sides thereof, the apex of said V projecting radialy outwardly between said plates and the sides of said V being spaced from the inner perimeter of said rings.

15. In a brake rotor, a brake ring comprising a plurality of spaced annular plates defining a fluid chamber therebetween, blades extending between said plates, and a hub member comprising a web V-shaped in radial cross-section connected to the radially inner extremity of said blades, said web being spaced from the inner perimeter of said ring to provide fluid inlet passages communicating with said chamber and being formed to direct fluid through said passages, said web extending axially outwardly of said ring at opposite sides thereof.

WALTER H. BASELT.

REFERENCES CITED

The following references are of record in the file of this patent:

UNITED STATES PATENTS

| Number | Name | Date |
| --- | --- | --- |
| 1,727,043 | Thompson | Sept. 3, 1929 |
| 2,208,525 | Eksergian | July 16, 1940 |
| 2,215,420 | Eksergian | Sept. 17, 1940 |
| 2,255,024 | Eksergian | Sept. 2, 1941 |
| 2,350,970 | Tack | June 6, 1944 |

Certificate of Correction

Patent No. 2,451,709.                                              October 19, 1948.

WALTER H. BASELT

It is hereby certified that errors appear in the printed specification of the above numbered patent requiring correction as follows:

Column 1, line 59, for the word "annual" read *annular*; column 4, line 59, claim 4, before "rotor," strike out *brake*; same line, after "comprising" insert *a pair*; column 6, line 40, claim 14, for "angular" read *annular*; line 47, for "radialy" read *radially*; and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*